Patented Aug. 27, 1946

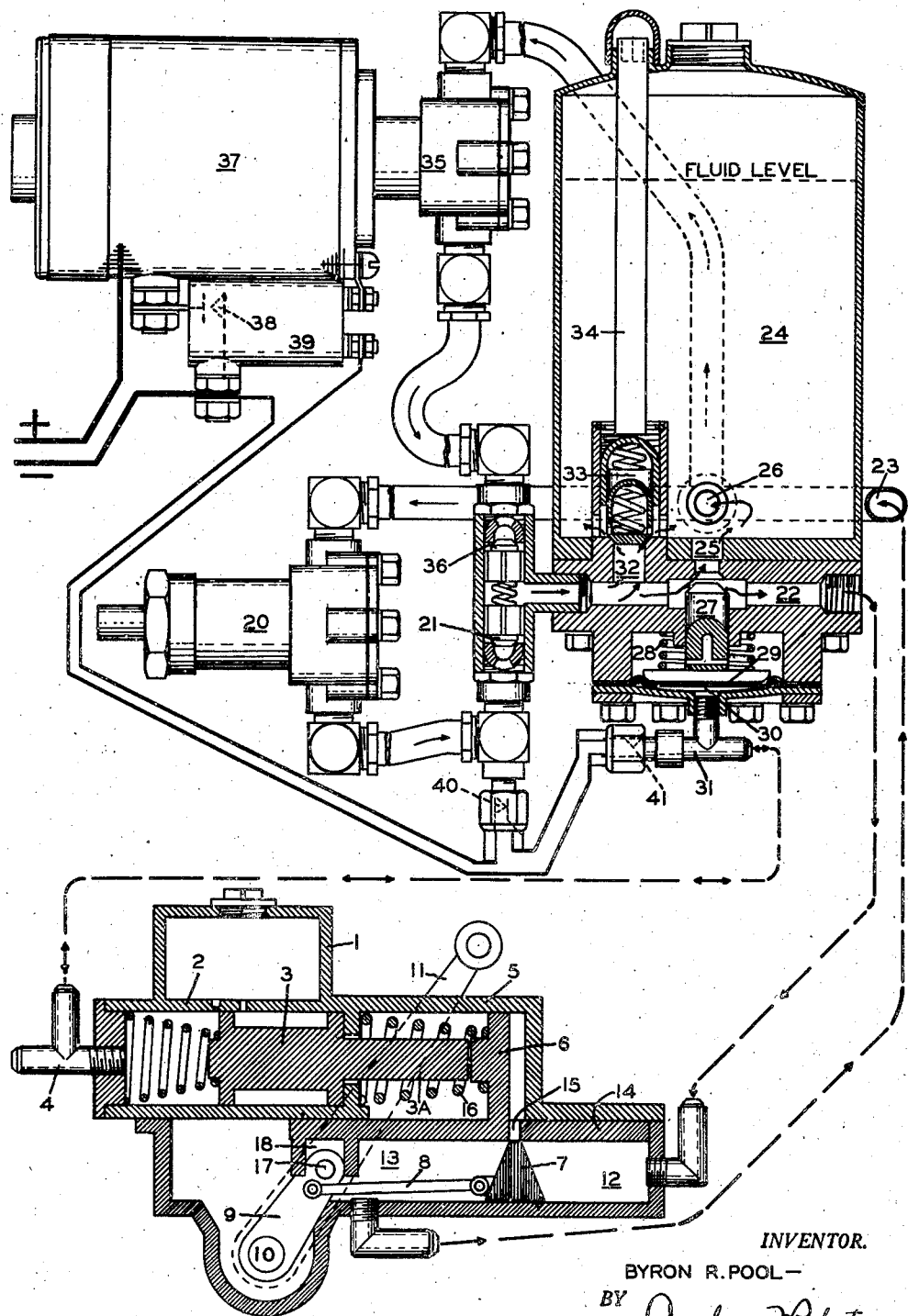

2,406,510

UNITED STATES PATENT OFFICE 2,406,510

AUXILIARY FLUID PRESSURE SYSTEM

Byron R. Pool, Evansville, Ind.

Application May 13, 1943, Serial No. 486,908

8 Claims. (Cl. 60—52)

It has heretofore been proposed to utilize the power of a fluid pressure system to actuate a work means so as to eliminate or reduce the manual effort otherwise required of an operator in actuating the work means. Thus, for example, power-operated actuating mechanisms have been proposed for utilizing the power of the lubricating system of an automotive vehicle, equipped with hydraulic brakes, to actuate the master cylinder in applying the brakes. The power-operated actuating mechanism therein disclosed comprises: an actuator arranged for extension from a normal position to any position in a working range to effect a corresponding extension of the work means and for retraction from any such extended position to the normal or any less extended position to permit a corresponding retraction of the work means; a similarly movable lead member arranged, when extended, to connect the pressure side of the fluid pressure system to the actuator and thereby extend it and, when retracted, to connect the drainage side of the pressure system to the actuator and thereby permit its retraction; a lag member movable with the actuator and arranged, when the actuator moves it to a position corresponding to that of the lead member, to disconnect the actuator from either pressure or drainage and thereby lock it in a corresponding position; and means for retracting the actuator and lead member when the actuator is connected to drainage.

It is sometimes impossible or undesirable to use the lubricating system as a source of fluid pressure. In such cases it is necessary to provide an auxiliary pressure system.

The present invention relates to a novel form of auxiliary system and has, as one of its principal objects, the provision of an auxiliary system which operates at no load at all times when the power-operated actuating mechanism is in its normal or off position.

Another object of the invention is to provide an auxiliary system in which power is built up more or less instantaneously upon the movement of the power-operated actuating mechanism out of its off position.

A further object resides in the provision of an auxiliary system having a main pump and an auxiliary pump so arranged that the auxiliary pump remains idle so long as the main pump remains operable but becomes automatically available as a source of pressure upon failure of the main pump.

A still further object of the invention is to provide a simple and relatively inexpensive auxiliary system in which the foregoing objectives are achieved.

An embodiment of the invention is illustrated in the single figure of the drawing in connection with a more or less schematic view of the power-operated actuating mechanism disclosed in my aforesaid co-pending application.

The present invention is not limited to use in connection with the aforesaid power-operated actuating mechanism but may be used in connection with other suitable power-operated actuators. Nor is it necessarily limited to use in connection with a work means in the form of a hydraulic brake system. A hydraulic brake system is shown in the drawing for illustrative purposes and, as shown, includes: a reservoir 1; a master cylinder 2; a master piston 3 having an extension 3A; and an outlet connection 4 leading from the master cylinder to the wheel cylinders which are not shown.

My power-operated actuating mechanism, as illustrated in connection with the foregoing brake system, comprises: a work means actuator having a power cylinder 5 containing a power piston 6 which abuts extension 3A; a lead member 7 manually operable through link 8, crank 9, shaft 10, and handle 11 to connect the power cylinder 5 to the pressure chamber 12 or drainage chamber 13 which are respectively connected to the pressure and drainage sides of a fluid pressure system; a lag member 14 having an opening 15, through which the connection of the power cylinder 5 to pressure (chamber 12) or drainage (chamber 13) is effected, and being movable with the actuator piston 6 so that the lag member operates, when the actuator piston reaches a position corresponding to that of the lead member 7 to lock the piston in such position by disconnecting the cylinder from pressure or drainage; and retracting means including a spring 16 which normally urges the piston 6 towards its normal or off position and which becomes effective to move the piston when the power cylinder is connected to drainage.

As illustrated, the foregoing parts are in the normal or off position. When handle 11 is moved leftward, it moves lead member 7 leftward and thus connects the power cylinder 5 through lag opening 15 to pressure 12. This extends power piston 6 leftward and thus correspondingly extends the master piston 3 to build up the braking pressure. However, as the power piston is extended leftward, it correspondingly extends the lag member 14 leftward. When lag member 14 and piston 6 reach positions corresponding to that of the lead member 7, the lag opening 15 is closed by lead member 7. The closure of opening 15 disconnects the power cylinder 5 from both pressure and drainage and thus locks the piston in a position corresponding to the position of the lead member. When the lead member 7 is further extended, the foregoing action is repeated to increase the braking pressure. When the lead member 7 is moved rightward or retracted, the power cylinder 5 is connected through lag opening 15 to drainage 13. The retracting spring 16 is now effective to retract both the actuator piston 6 and the lag member 14 until the latter reaches the lead member's position, at which the lag opening 15 is again closed and the actuator parts again locked in corresponding positions. Before passing on, it may be noted that the pin 17 in recess 18 permits manual operation of the actuator in the event of a fluid power failure.

To supply fluid power to the actuator, an auxiliary fluid pressure system is provided wherein a main hydraulic pump 20 is connected to force liquid through a check valve 21 into a fluid passage 22 leading to the pressure chamber 12 and to draw liquid from a fluid passage 23 which leads to the drainage chamber 13. The tubular seat of check valve 21 (and also of check valve 36) is partly broken in the drawing for the sake of clearness. In accordance with my invention, means are provided for establishing a short circuit between the pressure and drainage sides 22 and 23 of the fluid system, when the actuating mechanism is in its off position so as to permit the pump to circulate the liquid of the system endlessly under no load conditions at such time and for breaking the short circuit when the actuating mechanism is moved out of its off position so as to enable the pump to build up its pressure more or less instantaneously in order to operate the actuating mechanism. While the short-circuiting connection may be in the form of a pipe directly connecting passages 22 and 23, it is preferably made in the form of a tank 24 which is connected through passage 25 to pressure passage 22 and through one or more openings 26 to drainage passage 23. The tank 24 functions as a reservoir for the system and may, therefore, be filled to an appropriate level. To control the making or breaking of the short circuit, a valve 27 is arranged to open and close the short-circuiting passage 25. The valve 27 is normally urged, by spring 28, to the open or short-circuiting position illustrated in the drawing. To effect its closure and thus break the short circuit, means are provided to connect the valve to the actuator and to close the valve when the actuator is moved out of its normal or off position.

The valve closing or short-circuit breaking means may, as will be obvious, assume a variety of forms. For example, it would be an easy matter to effect its operation manually or to connect the valve 27 mechanically to the handle 11 or to some other suitably moving part of the actuating mechanism in such a manner as to close the valve automatically when the handle moves out of the off position and to hold the valve closed while the handle remains out of such position. Where the work means is in the form of a hydraulic system, it is simpler to open the valve automatically by connecting it hydraulically to the hydraulic system in such a manner that a slight initial pressure in the hydraulic system can be used to close the valve 27. The latter arrangement is illustrated and, as illustrated, comprises: an operating chamber 30 separated from the valve 27 by a flexible diaphragm 29 and connected hydraulically through connection 31 to the outlet 4 of the master cylinder.

With the foregoing arrangement, when the handle 11 is extended from the off position sufficiently to effect a slight extension of the master piston 3, (through pin 17, lag member 14, and piston 6) sufficient pressure will be built up in the hydraulic braking system to effect the closure of valve 27. Upon the closure of this valve, the pressure in the pressure system builds up more or less instantaneously. Since the initial movement of the handle has already opened the power cylinder to pressure, the pressure thus built up will be transmitted simultaneously to actuate the piston 6 to a position corresponding to that of lead member 7 and handle 11. If the power-operated actuating mechanism is designed to require say 50 lbs. per square inch of pressure to effect the full extension of the power piston 6, then the pump 20 may be designed to maintain that pressure under operating and static conditions. The use of a positive pump capable of substantially exceeding the highest operating pressure or to accommodate a range of substantially different operating pressures is preferred.

Accordingly, in further accordance with my invention, a high pressure connection 32 is established between pressure and drainage passages 22 and 23 and normally closed by an adjustable valve 33. As illustrated, the high pressure connection 32 leads from pressure passage 22 directly into the interior of tank 24 while the adjustable valve 33 is mounted within the tank and provided with a rod 34, projecting through the top of the tank, where it may be engaged for valve adjustment purposes. In operation, this valve will be adjusted to permit the desired operating pressure to be built up on the pressure side and to open when the pressure tends to exceed that value so as to release the excess pressure. Thus, when the actuator piston 6 is locked in any extended position and liquid thereby prevented from flowing into or out of it, the valve 33 will automatically open sufficiently to permit a continuous stream of liquid to flow from the high pressure side to the low pressure side at a rate such as to maintain a static operating pressure on the high pressure side.

In the operation of tanks and many other automotive vehicles, it is essential to reduce the chance of an operating failure to a minimum. With this in mind, a further feature of the invention is to provide an auxiliary pump 35 which is normally inoperative but which becomes conditioned for operation upon the failure of the main pump 20. To this end the auxiliary pump 35 is connected so that, when operated, it will force liquid through check valve 36 into pressure passage 22 while drawing liquid from drainage passage 23. The auxiliary pump 35 is driven by an electric motor 37. The operation of motor 37 is controlled by a normally open switch 38. The normally open switch 38 is arranged to be closed upon the electrical energization of a coil within coil box 39. The energization of this coil is, in turn, controlled by switches 40 and 41. Switch 40 is opened by the pressure generated in the main pump 20 and remains open so long as the minimum pressure is developed by that pump. Thus the pressure built up under no-load conditions is sufficient to maintain switch 40 open.

Switch 41, on the other hand, is arranged to be closed by the same mechanism that closes valve 27. When the valve 27 is open, switch 41 is open. In the arrangement illustrated, when the braking pressure is sufficient to close valve 27, it is effective to close switch 41.

With the foregoing auxiliary pump arrangement, when the handle 11 is moved from its off position sufficiently to build up a pressure in the braking system which is capable of closing valve 27, switch 41 will then be simultaneously closed. If at this time the main pump 20 is not operating, its switch 40 will likewise be closed. The closure of both switches 40 and 41 closes the circuit of the coil in coil box 39, causing the master switch 38 to be closed and thereby energizing the motor 37. The electrically driven pump 35 is thus placed in operation, the remainder of the system operating exactly as described in connection with pump 20. It will be understood, of course, that electrical power, for the electrical end of the system, may be received from any suitable source, such as storage batteries which are not shown.

Having described my invention, I claim:

1. A fluid pressure system for a power-operated actuating mechanism having actuating pressure and drainage sides and a manually operable element movable from a normal position through a range of working positions comprising: a main liquid pump having pressure and drainage sides respectively connected to the actuating pressure and drainage sides of the actuating mechanism; means for short-circuiting the flow of pump liquid from the pressure side to the drainage side when the operating element is in its normal position so as to enable the main pump to be operated under minimum load conditions at that time; means for breaking said short circuit when said element is moved out of its normal position so as to enable the main pump to build up an operating pressure; a normally inoperative auxiliary pump connected to said pressure and drainage sides; means conditioning the auxiliary pump for operation upon a failure of said main pump; and means connected to the actuating mechanism and arranged to start and stop the conditioned auxiliary pump when said element moves respectively out of and into its normal position.

2. The system of claim 1 wherein: the auxiliary pump is driven by an electrical motor having a control circuit; the conditioning means, upon a failure of the main pump, completes the control circuit up to a start and stop switch; and the connecting means controls the operation of the start and stop switch.

3. A fluid pressure system for a power-operated actuating mechanism having actuating pressure and drainage sides and a manually operable element movable from a normal position through a range of working positions comprising: a normally operating mechanically driven liquid pump having pressure and drainage sides respectively connected to the actuating pressure and drainage sides of the actuating mechanism; a check valve between the pump and its high pressure side; a low pressure connection for the flow of pump liquid from the pressure to the drainage side; a valve for opening and closing said connection; means for holding the valve in its open position when said element is in its normal position; means for closing said valve when said element is moved out of its normal position; a normally inoperative electrically driven auxiliary pump connected to said pressure and drainage sides; and auxiliary means for controlling said auxiliary pump, said means being responsive to both the liquid pressure between the mechanically driven pump and the check valve for said pump, and to the movement of said manual element relatively to its normal position and being operative upon a failure of such liquid pressure and upon movement of said manual element out of its normal position to place said auxiliary pump in operation.

4. The system of claim 3 wherein the auxiliary means includes: an electrical circuit for controlling the operation of the auxiliary pump, said circuit being normally arranged to prevent its operation; a control element responsive to the liquid pressure between the mechanically driven pump and the check valve for such pump and arranged for movement from a normal position to an auxiliary position upon a failure of such pump pressure; and another control element connected to the actuating mechanism for movement from an inoperative position to an auxiliary position upon movement of said element out of its normal position; said control elements cooperating in their auxiliary positions to cause said circuit to place said auxiliary pump in operation.

5. The system of claim 3 wherein the auxiliary means includes: an electrical circuit for controlling the operation of the auxiliary pump, said circuit being normally open to prevent its operation; a normally open switch serially arranged in said circuit for movement to a closed position upon a failure of the pressure of the mechanically driven pump; another switch serially arranged in said circuit and connected to the actuating mechanism for movement from an open position when said element is in its normal position to a closed position when said element is moved out of its normal position; said switches jointly controlling the opening and closing of said circuit.

6. A fluid pressure system for a power actuated work means comprising: a normally operating main liquid pump having pressure and drainage sides; a power cylinder having an operating chamber and a piston movable between fully retracted and fully extended positions to actuate the work means; a control valve having adjacent lead and lag members both of which are extendible and retractable along adjacent paths to any position within a range corresponding to the range of piston movement, the lag member containing an opening communicating at one end with said operating chamber and being movable with the piston, the lead member closing the other end of said opening when lead and lag members occupy corresponding positions and also dividing the interior of said control valve into pressure and drainage chambers that openly communicate respectively with the pressure and drainage sides of said pump; means for short circuiting the flow of liquid from the pressure side to the drainage side when the lead member is in its fully retracted position to enable the pump to operate under minimum load conditions at that time; means for breaking said short circuit when said lead member is moved out of its fully retracted position so as to cause said pump to establish an operating pressure in the pressure chamber of the control valve; a manually operable element connected to the lead member for extending it in one direction to any selected point in advance of the lag member to connect the lag member opening to the pressure chamber and thereby place the operating cylinder under pressure to extend both the piston and the lag member automatically to a position corresponding to the lead member's selected position where the lead member closes the lag member opening to seal the cylinder and thereby hold the piston in such corresponding position; said element being manually operable to retract the lead member in the opposite direction to any selected point in advance of the lag member to connect the lag member opening to the drainage chamber; and means operative, when the operating cylinder is connected to the drainage chamber, to retract both the piston and the lag member toward the lead member's selected position where the lead member again closes the lag member opening to seal the cylinder and hold the piston in such position.

7. The system of claim 6 including: a normally inoperative auxiliary pump connected to said pressure and drainage sides; and means rendering the auxiliary pump operative upon a failure of said main pump.

8. The system of claim 6 including: a normally inoperative auxiliary pump connected to said pressure and drainage sides; means conditioning the auxiliary pump for operation upon a failure of said main pump; and means operative, when said element moves respectively out of and into its fully retracted position, to start and stop the conditioned auxiliary pump.

BYRON R. POOL.